United States Patent
Cochard et al.

(10) Patent No.: US 8,144,867 B2
(45) Date of Patent: Mar. 27, 2012

(54) DURATION COMPUTING METHOD IN A SECURITY MODULE

(75) Inventors: Jimmy Cochard, Attalens (CH); Olivier Brique, Mont-sur-Lausanne (CH)

(73) Assignee: Nagravision S.A., Chesaux-Sur-Lausanne (CH)

( * ) Notice: Subject to any disclaimer, the term of this patent is extended or adjusted under 35 U.S.C. 154(b) by 1329 days.

(21) Appl. No.: 10/843,397

(22) Filed: May 12, 2004

(65) Prior Publication Data

US 2004/0240394 A1 Dec. 2, 2004

(30) Foreign Application Priority Data

May 14, 2003 (CH) ...................................... 0843/03

(51) Int. Cl.
*H04L 29/06* (2006.01)
(52) U.S. Cl. .......................................... 380/200; 380/1
(58) Field of Classification Search .................. 380/210, 380/203, 205, 211, 231, 232, 233, 234, 236, 380/239, 240, 242, 255, 42; 713/159, 172
See application file for complete search history.

(56) References Cited

U.S. PATENT DOCUMENTS

| | | | | |
|---|---|---|---|---|
| 4,893,248 A * | 1/1990 | Pitts et al. | ...................... | 705/400 |
| 5,282,249 A * | 1/1994 | Cohen et al. | ...................... | 380/229 |
| 5,461,675 A * | 10/1995 | Diehl et al. | ...................... | 380/229 |
| 5,774,546 A * | 6/1998 | Handelman et al. | .......... | 380/227 |
| 5,796,828 A * | 8/1998 | Tsukamoto et al. | .......... | 380/203 |
| 6,105,134 A * | 8/2000 | Pinder et al. | ................... | 713/170 |
| 6,192,190 B1 * | 2/2001 | Tojo et al. | ...................... | 386/109 |
| 6,466,671 B1 * | 10/2002 | Maillard et al. | .............. | 380/227 |
| 6,577,734 B1 * | 6/2003 | Etzel et al. | ..................... | 380/277 |
| 6,584,199 B1 * | 6/2003 | Kim et al. | ...................... | 380/203 |
| 7,031,781 B1 * | 4/2006 | Hamada et al. | ................. | 700/94 |
| 7,043,020 B2 * | 5/2006 | Maillard et al. | .............. | 380/227 |
| 7,139,398 B2 * | 11/2006 | Candelore et al. | ............ | 380/200 |
| 7,194,756 B2 * | 3/2007 | Addington et al. | ........... | 725/116 |
| 7,200,868 B2 * | 4/2007 | Mattox et al. | ................... | 726/26 |
| 7,224,310 B2 * | 5/2007 | Corinne | ........................ | 342/195 |
| 7,310,810 B1 * | 12/2007 | Hamada et al. | ................. | 725/91 |
| 7,477,744 B2 * | 1/2009 | Schipper | ....................... | 380/239 |
| 7,486,793 B2 * | 2/2009 | Cochard et al. | ............... | 380/231 |
| 7,721,088 B2 * | 5/2010 | Okamoto et al. | ............. | 713/157 |
| 7,747,853 B2 * | 6/2010 | Candelore | ..................... | 713/160 |
| 2002/0048367 A1 * | 4/2002 | Maillard | ....................... | 380/239 |
| 2002/0129249 A1 * | 9/2002 | Maillard et al. | .............. | 713/172 |
| 2002/0172362 A1 * | 11/2002 | Wonfor et al. | ................. | 380/201 |
| 2003/0158814 A1 * | 8/2003 | Cochard et al. | ................. | 705/50 |

(Continued)

FOREIGN PATENT DOCUMENTS

EP 0 912 052 A 4/1999

(Continued)

*Primary Examiner* — David García Cervetti
(74) *Attorney, Agent, or Firm* — Harness, Dickey & Pierce, P.L.C.

(57) ABSTRACT

Example embodiments are directed to a duration computing method in a security module inserted into an apparatus including an internal clock. The apparatus may receive a digital data stream encrypted via control words contained in a control message ECM. The method may include receiving data coming from the internal clock of the apparatus including a current temporal information, storing the data representing the current temporal information in the security module, receiving the control message ECM to decrypt at least one control word, reading previous data representing a previous temporal information at a moment of processing the previous control message ECM, and processing the control message ECM when the current temporal information is temporally ahead of the previous temporal information.

8 Claims, 1 Drawing Sheet

U.S. PATENT DOCUMENTS

| | | | |
|---|---|---|---|
| 2003/0174844 A1* | 9/2003 | Candelore | 380/277 |
| 2004/0054771 A1* | 3/2004 | Roe et al. | 709/224 |
| 2004/0086127 A1* | 5/2004 | Candelore | 380/281 |
| 2004/0178266 A1* | 9/2004 | Chia | 235/439 |
| 2005/0025312 A1* | 2/2005 | Rijkaert et al. | 380/37 |
| 2005/0089168 A1* | 4/2005 | Kahre | 380/211 |
| 2006/0117392 A1* | 6/2006 | Courtin et al. | 726/27 |
| 2006/0155989 A1* | 7/2006 | Nishimoto et al. | 713/166 |
| 2007/0098165 A1* | 5/2007 | Yoshikawa | 380/211 |

FOREIGN PATENT DOCUMENTS

| | | |
|---|---|---|
| EP | 0 975 165 A2 | 1/2000 |
| JP | 2002300559 * | 10/2002 |

* cited by examiner

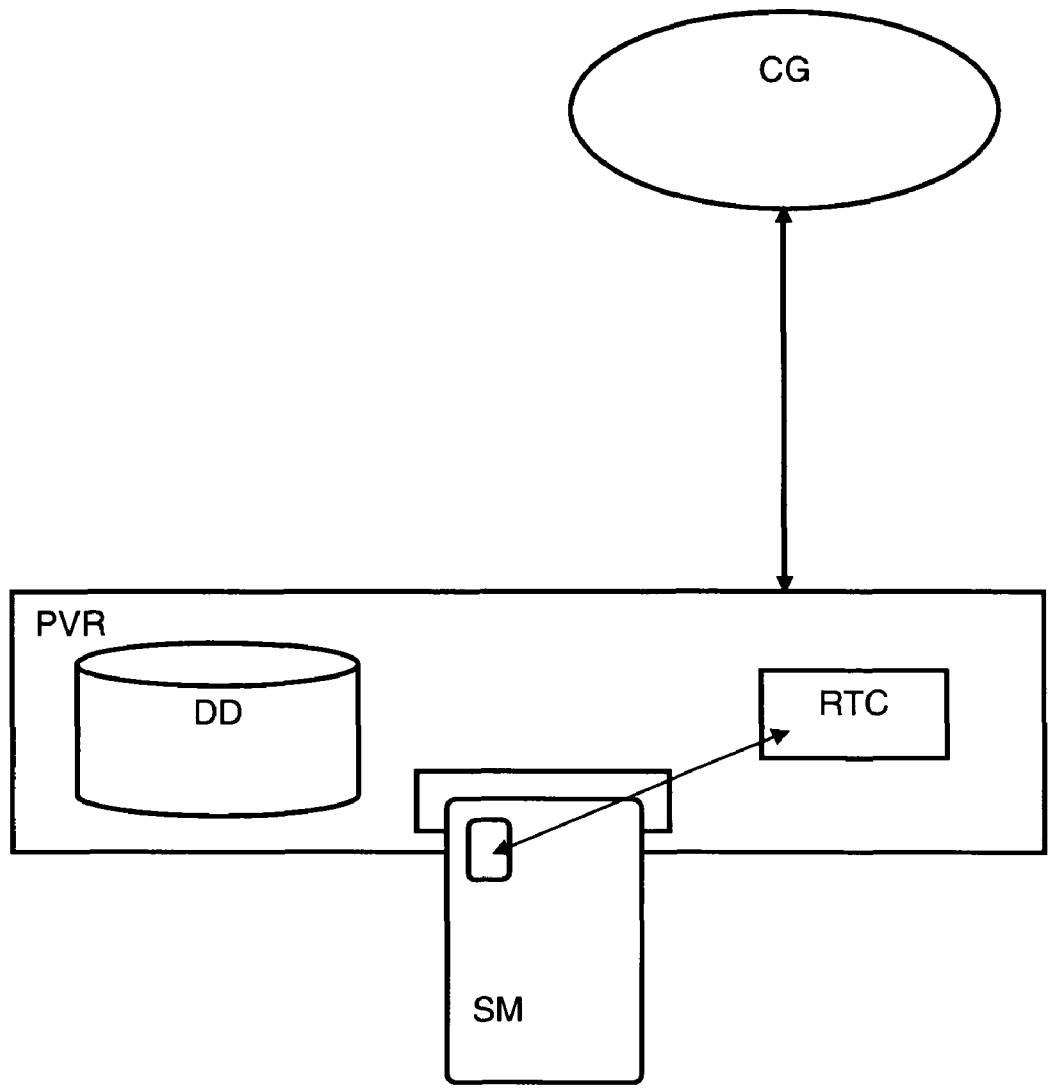

DURATION COMPUTING METHOD IN A SECURITY MODULE

The present invention concerns the domain of security modules inserted into an apparatus receiving encrypted digital data. In particular, the method of the invention aims to provide the date and the current time to a security module and to manage the decryption rights according to the validity duration of the data received or stored in the apparatus.

This method is applied, for example, to a digital video recorder used for reception and storage of Pay-TV programs.

A digital video recorder called hereinafter a PVR (Personal Video Recorder) is a Pay-TV receiver/decoder provided with a hard disk allowing the storage of encrypted audio/video digital data in order to be visualized at a later time.

A PVR, like a VHS type magnetic tape video recorder, is also provided with fast fast-forward and rewind running functions. These functions allow, for example, a search of a particular sequence among the recorded data on the hard disk or to return to the beginning of a recorded program after a first visualization.

The stored audio/video digital data is encrypted with control words CW contained in control messages ECM (Entitlement Control Message) that accompanies the encrypted audio/video data. This set of audio/video data and ECM is called content in the following description of the invention. An access control module or security module in the form of a removable smart card or integrated into the PVR contains rights attributed to a user to decrypt the audio/video data.

To visualize the content stored on the hard disk, the decoder decrypts said content with the aid of rights' management messages EMM (Entitlement Management Message) recorded in the security module, these messages comprising the keys necessary to decrypt the ECM containing the control words CW that serve to decrypt the content.

The digital data stream transmitted by a management center towards the PVR is encrypted in order to be able to control its utilization and to define conditions for such utilization. The control words CW in charge of the encryption are changed at regular intervals (typically between 5 and 30 seconds) in order to prevent any fraudulent attempt to recreate this control word.

So that the PVR/decoder may be able to decrypt the encrypted stream using these control words, the latter are sent in control messages ECM and encrypted by a transmission key specific to the system.

During the decryption of a control message ECM, the presence of the right to access to the content of the security module is verified. This right is managed by the management messages EMM that load such right into the security module.

The accounting of the encrypted content utilization is generally based on the subscription principle, on the spontaneous or impulsive purchase of television programs contents or on payment by time unit.

The subscription allows the definition of a right associated to one or several broadcasting channels transmitting these contents and allows the user to visualize them in clear if the right is present in his security module.

It is also possible to define rights specific to one type of content, such as a film, a sporting event or a variety program. The user can buy this content that will be specifically managed by this right. This method is known under the denomination "pay-per-view" (PPV).

With reference to payment by time unit, the security module includes a credit that is debited according to the actual consumption of the user. So for example, a unit will be debited from this credit every minute regardless of the channel or the visualized contents. It is possible, according to the implementation techniques, to vary the accounting unit, either in duration, in allocated time value or by combining these two parameters to adapt the invoicing to the type of consumed content.

A control message ECM does not only contain the control word CW but also the conditions for that this word is re-sent to the PVR. During the decryption of the control words, it will be verified if a right associated to the access conditions included in the message is present in the security module. The control word is returned to the PVR only when the result of the verification is positive. This control word contained in the control message ECM is generally also encrypted with a transmission key.

To summarize, the three following elements are necessary to decrypt an audio/video digital data stream transmitted at a given time:
   the content encrypted with one or a plurality of control words CW,
   the control message(s) ECM containing the control words CW and the access conditions,
   the corresponding right stored in the security module allowing the verification of the access conditions.

An access condition associated to the right can consist in a validity duration, that is to say a period during which it is possible to decrypt the contents with the control words. When this duration has expired, the access condition to the controls words serving to decrypt the contents becomes null and void and the decryption can no longer be carried out.

To exploit the time or duration parameter relative to the access conditions, it is necessary to dispose of a secure reference clock. The expiration of the validity of a right must be controlled as an absolute time and not as a relative duration. For example, an access right of 24 times to an encrypted content and stored on the hard disk begins on a determined date and time to finish the next day at the same time. It is thus not sufficient to grant the duration of 24 times to this right because there remains the possibility to manipulate the clock in order to postpone the current date of one day and thus to benefit permanently of a right having a 24 times duration.

The current date and time are supplied to the security module by the internal clock of the PVR also called RTC (Real Time Clock) that is generally power supplied by a battery allowing its working even when the apparatus is switched off.

This clock can be set to a date and to a time prior to the current values to authorize the visualization of a content whose validity would have expired. It is thus possible to fraudulently extend a right with modified access conditions in the security module by manipulation of the PVR clock.

It is thus a question of creating a right in the security module, with the aid of management messages EMM, which begins at a determined moment for ending after a certain validity period. As in the majority of cases, a PVR does not have a back channel linking it to the management center; the current date and time cannot be supplied regularly to the security module by secured means coming directly from the management center Another aspect of the problem resides in the fact that the security module, although having a secure memory, does not dispose of a real time clock and therefore it is impossible, using its own means, to determine a real duration such as 24 times. Therefore, if a user is authorized to access a service (or a film) during 24 times, the security module remains dependent on external information to determine the expiration of this period.

The aim of this invention is to propose a method to supply a control of the validity duration of a right registered in a security module in absolute terms by means of a management of the different received parameters allowing the determination of an expiry date and time.

Another aim 1s to prevent the creation of a right in the security module before or after a certain predefined date or time.

These aims are achieved by a duration computing method in a security module inserted into an apparatus comprising an internal clock; this apparatus receiving a digital data stream encrypted by control words contained in the control messages ECM, this method comprising the following steps:

reception of data coming from the internal clock of the apparatus comprising a current time information, storage of the current data representing the current temporal information in the security module, reception of a control message ECM requiring the decryption of at least one control word, reading of previous data representing previous temporal information at the moment of the processing of the previous control message ECM, processing of the control message ECM when the current information is temporally ahead of the previous information.

Thus the method according to the invention aims to guarantee that for each decryption of an ECM, the time moves forward.

Temporal information is understood to mean every form of counter that does not necessarily correspond to a date and/or time. The essential factor is to supply information about the actual time advance to the security module in order to determine a predefined duration.

The apparatus in question can be a digital television decoder, a digital recorder PVR (Personal Video Recorder) or even a personal computer.

It is not necessary that the time and the date generated by the decoder correspond to that which is usually used. Such an example is proposed by the Swatch Beat that is the division of 24 hours into 1000. The decoder generates impulses (or ticks) at a regular rhythm of 3 seconds. These signals are transmitted and accounted by the decoder to form its own temporal information recognized in this system. The current value of this parameter will thus be greater than the previous value, allowing the determination of the time advance. The current value is stored in a memory and on reception of a new value, the latter replaces the current value only if the new temporal information is temporally in advance on the current temporal information. Thus for each impulse, the decoder determines the current temporal information and transmits said information to the security module. The latter updates the content of its current memory.

Furthermore, the temporal information can be stored in the form of a representation (compression) or a cryptogram on condition that it allows the distinction of the advance, (increase of certain predetermined digits or bits or change of particular prefixes or suffixes etc.).

When the apparatus is connected to a management center as in the case of a digital recorder PVR, the management center can broadcast the current temporal information for updating the internal clock of the decoder.

According to a preferred variant, the method of the invention is applied to a digital video recorder for digital pay-television programs PVR including a permanent internal clock RTC.

According to an embodiment variant, it is verified furthermore during the reception of new temporal information by the security module that this information is in advance of the information received previously, independently on the moment of the control words decryption. In fact, the rhythm of transmission of the messages containing this temporal information by the decoder is a rhythm specific to the decoder. This additional condition forces the time to advance continually.

The PVR is sporadically connected to a management center that issues a digital video audio data stream encrypted by control words contained in the control messages ECM accompanying said audio video data. These control messages also contain temporal information that is secured since it is encrypted by the management center.

The security module contains the rights serving to verify the access conditions contained in the control messages ECM together with the control words.

The rights contained in the security module authorize the decryption of the ECM only if the current temporal information representing the date and the time coming from the PVR clock is ahead of the previous temporal information. This condition can no longer be fulfilled when the internal PVR clock is delayed. In fact, in this case, the decryption of the control messages ECM recorded on the hard disk cannot be carried out without the valid right. Only a connection of the PVR to the management center will allow the re-updating of the clock by means of the broadcasted ECM containing temporal information representing the real date and time.

According to an embodiment, the date and time of the PVR are transmitted to the security module in a form encrypted with a session key in order to avoid any modification of the value. Verification is also carried out to prevent updating with imaginary values.

The unique FIG. 1 shows a PVR equipped with a hard disk DD including an internal clock RTC. A removable security module SM issues the necessary rights to decrypt the audio video data stream coming from the management center CG and to decrypt the contents recorded on the hard disk DD. In addition to the rights validity duration, the security module SM contains a date/time of the validity start provided by the clock RTC.

The PVR is used on one hand as an on-line decoder of a transmitted audio video data stream and on the other hand as a data recorder for their subsequent visualization.

In the first using mode, said on-line, the ECM including the access conditions and temporal information are sufficient to manage the rights based on a duration since the control message ECM already contains the temporal data which allows the duration of the right to be determined.

In the second mode, where a content is recorded and visualized later, the temporal information of the control messages ECM is ignored, in this case, it is the temporary data coming from the decoder PVR that will serve to calculate the validity duration of the right.

The current time stored in the security module is used to calculate the duration of a right allocated with the purchase of a program; this purchase is managed with the aid of the management messages EMM. According to the type of embodiment, it can be imposed either the reception of the EMM messages is made on-line (directly received in the stream) or the utilization of such message stored in the storage unit. In the first case, it will be advantageous to use the temporal information contained in such message because it will be considered as secure since it comes directly from the management center. It is to be noted that despite this apparent security, it will be verified that this date is equal or posterior to the last known date by the security module.

In the second case, the stored management message EMM cannot be used to update the internal clock of the security module and it is the last known date that will be used to calculate the duration to be allocated to the right.

The control messages ECM used in the method according to the invention contain temporal information, in addition to a description of the type of content and the associated control words. During the direct reception of a stream containing control messages ECM, the temporal information will be used to determine the current time.

The definition of the temporal advance authorizing the decryption of the control words is determined by the difference between the current temporal information provided by the decoder's clock and the temporal information that represents the moment of the last decryption of a control word. This difference cannot simply be equal (or near) to the control word change period. In fact, it is necessary to take in account that in fast running mode, this period is multiplied by 10, for example.

This difference will thus be defined in our example as being close to 1/10 of the control word change period.

This difference value defines the expansion ratio of the real validity. For example, when the control word change period is 10 seconds and the ratio between the fast running speed and the normal running speed is 10, the minimum value of the difference will be 10 seconds divided by 10, namely 1 second. In consequence, the security module will accept the decryption of a new control word as long as its clock is one second ahead at the moment of the decryption of the last control word.

A potential fraud consists in supplying temporal information to the security module at a slower rhythm. This would be carried out by mounting a quartz with a lower frequency on the internal PVR clock. The security module cannot distinguish a priori the fast running speed from the normal running speed during the decryption of the ECM. Therefore, the duration of the right would be multiplied by a factor of 10, namely for example a duration extended to 10 days instead the one foreseen for 1 day.

It should be noted that in this case it would no longer be possible to use the fast running mode because the control word change period becomes lower than the minimum difference value.

This drawback can be considered as admissible since the user has bought the right at least once. Furthermore, during a more recent right purchasing, the old temporal information stored in the security module is replaced by new temporal information representing the date/time of the purchase. In this way the right extended fraudulently expires immediately and the significance of this type of fraud remains thus limited.

It is possible for the security module to be aware of the mode in which the PVR is set and thus to adjust the minimum duration between two control word decryptions. In the fast running mode, this duration will be one second when in the normal running mode, this duration is fixed to 10 seconds. Thus, a fraudulent individual would not only modify the frequency of the PVR clock but also the commands transmitted between the PVR and the security module.

The validity of a right is determined by the security module from the temporal information recorded during the purchase of a program. It is thus recommended that this information in the security module is updated at each purchase, otherwise the new right created will have a reduced validity period in case the temporal information recorded in the security module is too old.

Due to the fact that the security module does not accept that the decoder PVR provides to said module a temporal information prior to the current information of the clock RTC, the management of this clock must be adapted to certain requirements:

The clock RTC of the PVR will preferably be power supplied with a battery that maintains its working even when the PVR is switched off.

A representative value of the date and time is transmitted to the security module by the clock RTC.

The updating of this clock RTC preferably provokes the advance of the current time, The values are adjusted with a description table of the date and the time TDT (Time and Date Description Table) to which the PVR refers when it is on-line, that is to say when it is connected to the management center. This table is synchronized with the temporal information contained in the ECM broadcasted by the management center.

The user of the PVR should not directly adjust the clock RTC. If the date and time displayed on the PVR front panel screen must nevertheless be adjusted, the adjustment is first stored in a non-volatile memory as being a difference with the current value of the clock RTC. The new date/time to be displayed will then be calculated from this stored difference.

When the PVR is off-line, the clock RTC not should be modified or at least not delayed in relation to the value registered in the security module.

When the PVR is on-line and if the clock RTC is delayed in relation to the reference date/time of the table TDT, the clock RTC is re-synchronized in a single step with this reference.

When the clock RTC is in advance on the reference TDT, the direct re-synchronization as in the previous case is not desirable since the new current temporal information will be delayed in relation to the previous temporal information stored in the security module. The condition that imposes a positive difference between this two information sets is no longer fulfilled and the security module will not decrypt the control words.

For example the PVR is connected on-line at 10.00.00 o'clock when the clock RTC of the PVR indicates 10.02.00 o'clock, namely 2 minutes ahead. The difference waited for decrypting the control words being 10 seconds.

The PVR sends messages as follows:
a first message at 10.00.00 indicates that the time is 10.02.01
a second message at 10.00.20 indicates that the time is 10.02.10
a third message at 10.00.40 indicates that the time is 10.02.20 and so on.

After 4 minutes, the clock RTC of the PVR is re-synchronized with the time indicated by the management center while maintaining the possibility to decrypt data stored on the hard disk in accordance with the time registered in the security module.

In the case of a personal computer, the method of the invention is applied on the downloading of files such as software, games, films and music from the Internet. The computer is provided with a security module that manages a right to access to downloaded files or to use said files a limited time. The necessary temporal information is generated by the internal clock of the computer that can also be updated during the connection of the computer to the Internet.

The invention claimed is:

1. A duration computing method in a security module inserted into an apparatus including an internal clock, the security module having a decryption time memory and a current time memory, the apparatus receives a digital data stream encrypted via control words contained in a control message ECM, the method comprising:

receiving data coming from the internal clock of the apparatus including a current temporal information, storing the current temporal information into the current time memory in the security module, receiving the control message ECM to decrypt at least one control word, reading the decryption time memory representing a previous temporal information at a moment of processing a previous control message ECM, processing the control message ECM when the current temporal information is temporally ahead of the previous temporal information, and storing the current temporal information into the decryption time memory, verifying during the reception of the current temporal information that the information is temporally ahead of the previous temporal information, wherein the security module contains rights serving to verify access conditions contained in the control message ECM together with the control words, and the rights contained in the security module authorize the decryption of the control message ECM when the current temporal information representing date and time is temporally ahead of the previous temporal information, wherein the apparatus is connected to a management center, the current temporal information of the apparatus is updated by messages received from the management center, and wherein the apparatus is a digital video recorder PVR for digital pay television programs.

2. The method according to claim 1, wherein a condition defining a temporal advance is determined by a frequency of control word changes.

3. The method according to claim 1, wherein the current temporal information is stored in the current time memory and on reception of a new current temporal information, the latter replaces the current temporal information as long as the new temporal information temporally advances the current temporal information.

4. The method according to claim 1, wherein the current temporal information determines a date and a time.

5. The method according to claim 4, wherein the current temporal information of the security module serves to verify the validity duration of a right necessary for the decryption of the digital data stream.

6. The method according to claim 1, wherein said current temporal information updates a counter in the apparatus to provide a value representative of the date and time that will be stored and then compared with a value of the previous temporal information generated by the internal clock of the apparatus.

7. The method according to claim 6, wherein the internal clock of the apparatus is updated according to the result of the comparison, an updated value being transmitted to the security module.

8. The method according to claim 1, wherein the internal clock of the apparatus is updated by current temporal information transmitted by the control message ECM broadcasted when said apparatus is connected to the management center.

\* \* \* \* \*